(12) United States Patent
Bajorins et al.

(10) Patent No.: US 6,804,422 B1
(45) Date of Patent: Oct. 12, 2004

(54) INTEGRATED OPTIC COMPONENT FOR BINOCULAR FSO TRANSCEIVER

(75) Inventors: David Paul Bajorins, Redmond, WA (US); James S. Webb, Seattle, WA (US)

(73) Assignee: Terabeam Corporation, Redmond, WA (US)

( * ) Notice: Subject to any disclaimer, the term of this patent is extended or adjusted under 35 U.S.C. 154(b) by 397 days.

(21) Appl. No.: 10/008,453

(22) Filed: Dec. 5, 2001

(51) Int. Cl.[7] .............................. G02B 6/12; G02B 6/32
(52) U.S. Cl. ......................... 385/14; 359/407; 385/33
(58) Field of Search .......................... 385/14; 398/118, 398/128, 130

(56) References Cited

U.S. PATENT DOCUMENTS

| | | | | |
|---|---|---|---|---|
| 4,330,870 A | * | 5/1982 | Arends ........................ | 398/129 |
| 4,807,987 A | * | 2/1989 | Bastable et al. ............ | 351/205 |
| 4,932,775 A | * | 6/1990 | Wissman et al. .......... | 356/5.09 |
| 5,060,304 A | * | 10/1991 | Solinsky ..................... | 398/129 |
| 5,142,400 A | * | 8/1992 | Solinsky ..................... | 398/129 |
| 5,204,774 A | * | 4/1993 | Owen et al. ................ | 359/418 |
| 5,390,040 A | * | 2/1995 | Mayeux ...................... | 398/129 |
| 5,619,006 A | * | 4/1997 | Maus ............................ | 89/1.1 |
| 6,031,662 A | * | 2/2000 | Miller et al. ................. | 359/407 |
| 6,052,190 A | * | 4/2000 | Sekowski et al. ........... | 356/601 |
| 6,381,055 B1 | * | 4/2002 | Javitt et al. .................. | 398/131 |
| 6,496,465 B1 | * | 12/2002 | Broome et al. ........ | 369/112.08 |
| 6,597,476 B1 | * | 7/2003 | Okorogu ....................... | 359/15 |

* cited by examiner

Primary Examiner—John D. Lee
Assistant Examiner—Jennifer Doan
(74) Attorney, Agent, or Firm—Blakely Sokoloff Taylor & Zafman LLP

(57) ABSTRACT

An integrated optical component and FSO transceiver using the same. In one embodiment, the integrated optical component comprises a monolithic substrate having a plurality of optics formed therein, including a receiver optic, transmitter optic, a pickoff lens, and a pair of total internal reflection (TIR) fold mirrors. The receiver optic directs a majority of an incoming optical signal towards a data detector, while a small portion of the optical signal passes through the pickoff lens, is redirected by a first TIR fold mirror towards a second TIR fold mirror, and is then redirected towards a optical beam position sensor. In another embodiment, a plurality of tracking lenses and respective TIR fold mirrors are disposed around the periphery of the receiver optic. Portions of the incoming optical signal are received by the tracking lenses, redirected by the TIR fold mirrors toward a TIR combiner and then towards a beam position sensor.

42 Claims, 10 Drawing Sheets

INTEGRATED OPTIC COMPONENT FOR BINOCULAR FSO TRANSCEIVER

TECHNICAL FIELD

The present invention relates generally to optical communication systems, and in particular, to a method and apparatus that uses an integrated optic component to improve performance and lower costs of free-space optical communication systems.

BACKGROUND

With the increasing popularity of wide area networks, such as the Internet and/or World Wide Web, network growth and traffic have exploded in recent years. Network users continue to demand faster networks, and as network demands continue to increase, existing network infrastructures and technologies are reaching their limits.

An alternative to existing hardwire or fiber network solutions is the use of wireless optical telecommunications technology. Wireless optical telecommunication systems, also known as "free-space optical" (FSO) communication systems, utilize beams of light, such as lasers, as optical communications signals, and therefore do not require the routing of cables or fibers between locations. Data or information is encoded into a beam of light, and then transmitted through free space from a transmitter to a receiver. Typically, a pair of transceivers are used to form a communication link, wherein each transceiver provides both receive and transmit functions.

For point-to-point free space laser communications, the use of narrow optical beams provides several advantages, including data security, high customer density, and high directivity. High directivity makes the achievement of high data rates and high link availability easier, due to higher signal levels at a receiver. In order to take full advantage of this directivity, some form of tracking is often necessary to keep the antennas of a transmitter and of the receiver properly pointed at each other. For example, a transmitted optical beam with a 1-mrad divergence has a spot diameter at the receiver of about 1 meter at a 1-km range. Thus, movement of the transmitter or receiver by even a small fraction of the divergence (or field-of-view) could compromise the link unless active tracking is employed. Since high-speed communication channels utilize extremely sensitive detectors, such systems require equally sensitive tracking systems.

Charge coupled device (CCD) arrays or quadrant cell optical detectors (sometimes referred to as "quad cells") may be used as tracking detectors in a tracking system. In either case, an electrically controllable steering mirror, gimbal, or other steering device may be used to maximize an optical signal (e.g., light) directed at a high-speed detector, based on information provided by the tracking detector. This is possible since optical paths for tracking and communication are pre-aligned, and the nature of a tracking signal for a perfectly aligned system is known. However, at certain wavelengths, a lower wavelength tracking beam is often necessary due to limitations of the detection systems. Such separate wavelengths are typically used with their own set of transmitter optics, thereby requiring the use of additional optical and mechanical hardware. Furthermore, designs using separate beacon and communication optical transmitters require more time in manufacturing because of the need to co-align the two optical transmitters. Such separate transmitter paths are also more susceptible to mis-alignments due to mechanical shock and/or thermal stresses.

A schematic diagram corresponding to a typical optic position correction control loop used in a conventional binocular FSO transceiver is illustrated in FIG. 1. The objective of the control loop is to control the position of a binocular FSO transceiver 10 such that an incoming optical signal having a maximum signal strength: is received by a data detector 12. In the illustrated configuration, an incoming light beam comprising a received optical signal 14 is received by a receive lens 16 and directed toward data detector 12, which is located at the receive lens' focal point. A beam splitter 18 is disposed in this light path so as to split the received light beam into two portions. The beam splitter directs a majority (e.g., 80–90%) of the beam's energy toward data detector 12, whereupon the received signal is processed by a signal processing block 20 to generate data 22. A remaining portion (e.g., 10–20%) of the light beam is redirected towards a optical beam position sensor 24. Generally, the optical beam position sensor may comprise a quad cell, CCD, electronic camera, or any other sensor that is capable of detecting the position of a light beam. The beam position sensor generates an error signal (or position or signal strength data from which an error signal can be derived), which is received by a position controller 26. The position controller processes the error signal, position and/or signal strength data to generate a position signal that is used to drive a positioner 28 operatively coupled to the housing of the binocular FSO transceiver to position the transceiver.

In addition to the foregoing signal receiving components, binocular FSO transceiver 10 also includes a set of components used to transmit an outgoing optical signal 30. These components include a data signal generator 32, which drives a transmit laser 34 to produce a optical signal that is collimated (or divergent) by a transmit lens 36 into an optical beam corresponding to outgoing optical signal 30.

This conventional approach has several potential problems. The accuracy of the alignment between the various optical components in the binocular FSO transceiver is critical and must be maintained. One unintended result is that relative physical movement (i.e., drift) between components due to environmental considerations such as vibration and temperature changes may cause changes in the alignments, resulting in performance degradation. For example, suppose that the optical beam position sensor loses alignment with the beam splitter. As a result, when the binocular FSO transceiver and/or its components are positioned so as to produce a maximized signal (based on measurements taken by the optical beam position sensor), the actual signal received by data detector 12 will no longer be a maximum signal. In addition, each optical component must be accurately manufactured and mounted, adding significant cost to the transceiver.

SUMMARY OF THE INVENTION

In accordance with one aspect of the invention, an integrated optical component is provided for use in an FSO transceiver. In one embodiment, the integrated optical component comprises a monolithic optically-translucent substrate having a plurality of optics formed therein, including a receiver optic, transmitter optic, a pickoff lens, and a pair of total internal reflection (TIR) fold mirrors. The receiver optic directs a majority of an incoming optical signal towards a data detector, while a small portion of the optical signal passes through the pickoff lens is directed towards a first TIR fold mirror. Upon impinging on a substrate/air interface defined by the first TIR fold mirror, the portion of the optical signal is redirected towards a second TIR fold mirror, which then redirects the portion of light towards a optical beam position sensor. In an optional configuration, only a single TIR fold mirror is used, which directs the portion of the optical signal towards the optical beam position sensor.

In accordance with a second embodiment of the invention, a plurality of tracking lenses and respective TIR fold mirrors are disposed around the periphery of the receiver optic. Respective portions of an incoming optical signal are received by the tracking lenses and redirected by the TIR fold mirrors toward a TIR combiner, which then redirects the respective portions towards a optical beam position sensor.

Additional aspects of the invention concern FSO transceivers in which the various integrated optic component embodiments may be implemented and position control schemes used by the FSO transceivers. In one embodiment, an FSO transceiver is controlled based on position data obtained from its own optical beam position sensor through use of it integrated optic component. In another embodiment, a communication link with a second FSO transceiver is established, and the position of the first FSO transceiver is controlled, at least in part, using position data obtained by a optical beam position sensor corresponding to the second FSO transceiver that is transmitted back to the first FSO transceiver, this is often referred to as "login loop pointing".

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE ILLUSTRATED EMBODIMENTS

Embodiments of an integrated optical component and FSO transceivers for use in an optical wireless communication system are described herein. In the following description, some specific details are given to provide a thorough understanding of embodiments of the invention. One skilled in the relevant art will recognize, however, that the invention can be practiced without one or more of the specific details, or with other methods, components, materials, etc. In other instances well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The present invention harnesses the power of integrated optics to combine the receiver (Rx), transmitter (Tx) and tracking optics into a single component. This is enabled, in part, through use of one or more Total Internal Reflection (TIR) fold mirrors. A TIR fold mirror comprises a substrate/air interface formed by an internal facet defined in an optically-translucent substrate that enables light to be redirected (reflected rather then transmitted) based on the ratio of the index of refraction of the substrate material and the index of refraction of the surrounding material (typically air, which has an index of refraction of 1). The angle of incidence at which this occurs is called the critical angle; beyond this angle all incident light is reflected. As light passing through the substrate impinges on an appropriately angled interface, it is internally reflected such that it is redirected at an angle that is based on the angle between the path of the light relative to the angle of the facet (the angle of a reflected beam is not dependant on the index of the material).

Figure 1:
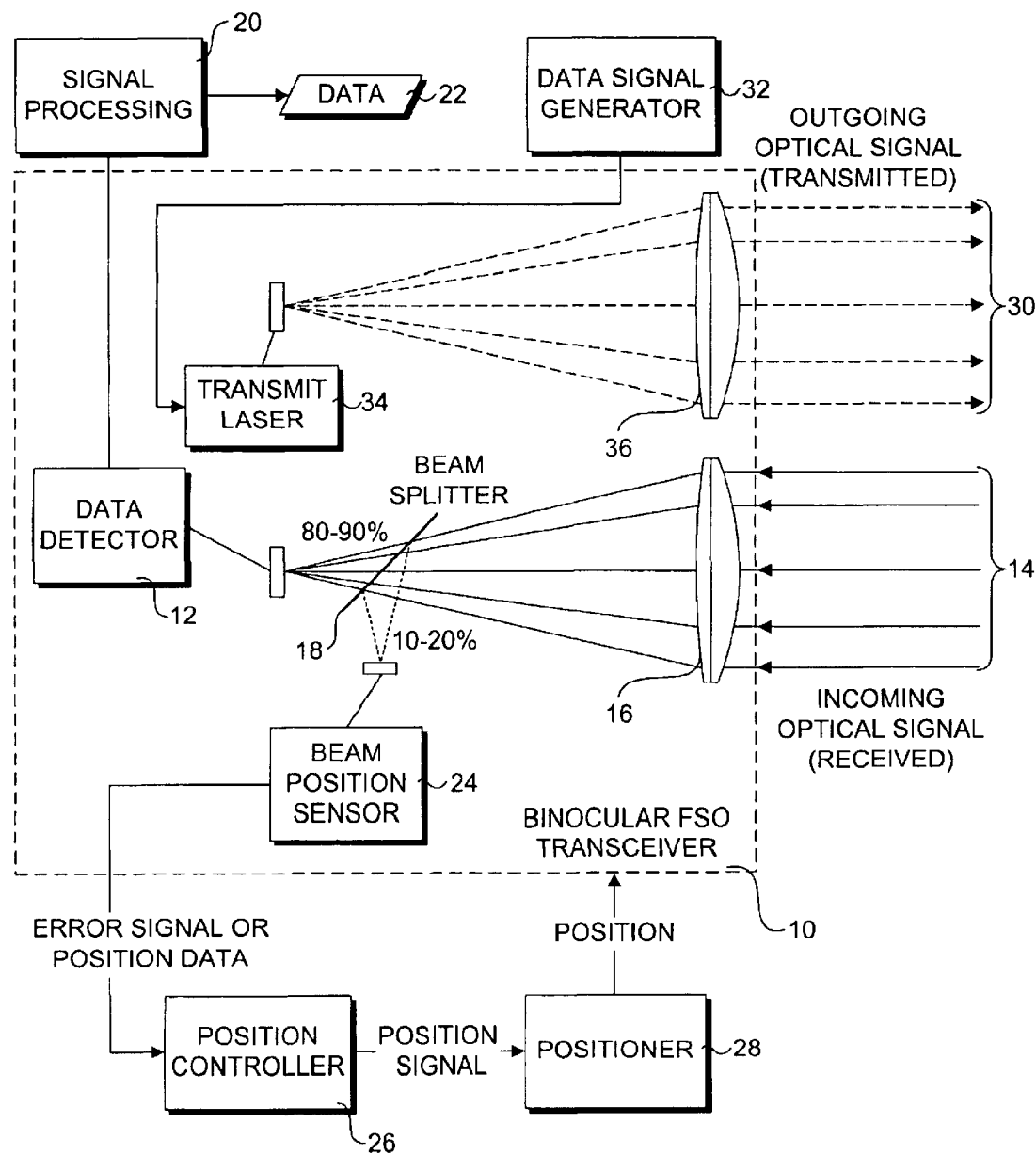
FIG. 1 is a block schematic diagram illustrating the primary optical components and control blocks used in a conventional binocular free-space optical (FSO) transceiver.
Figure 2:
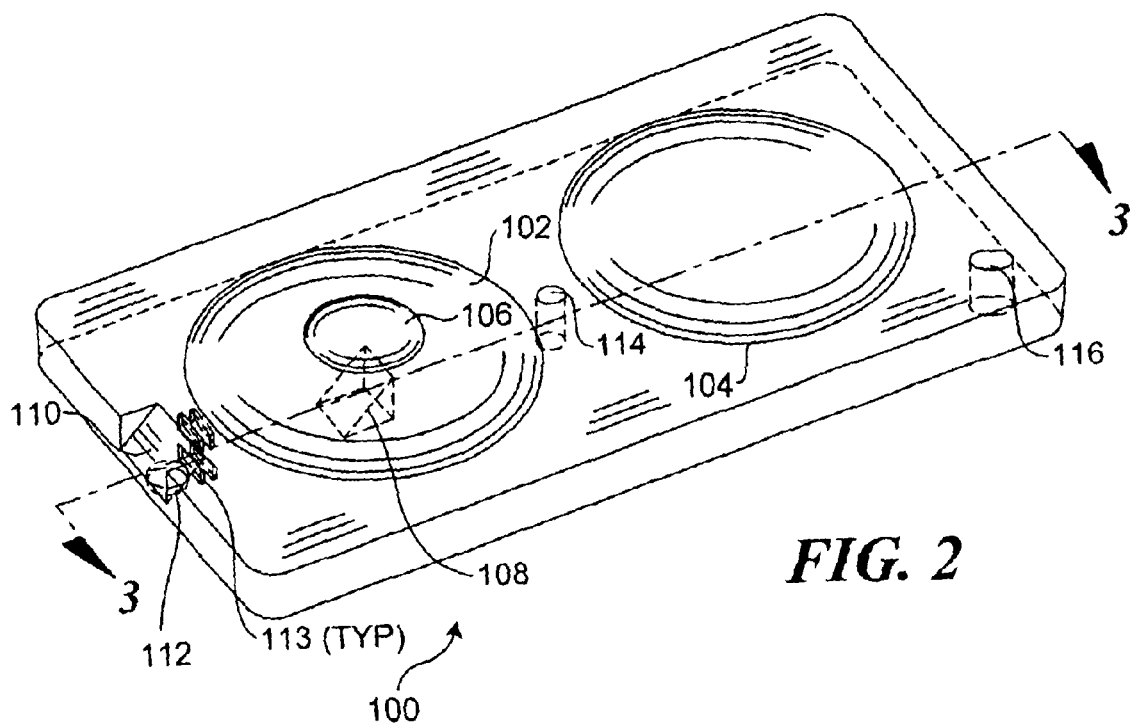
FIG. 2 is an isometric view of a first embodiment of the invention in which a pickoff lens and a pair of total internal reflection (TIR) fold mirrors are used to replicate the functions provided by a beam splitter in a convention FSO transceiver.
Figure 3:
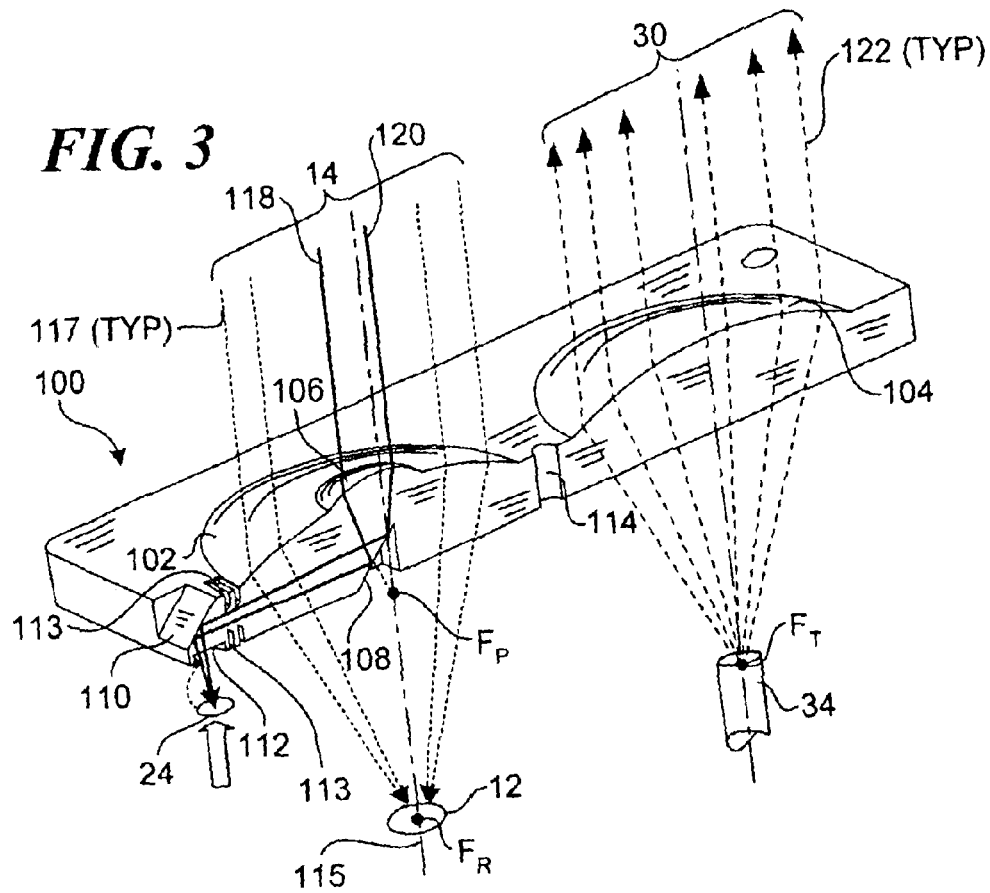
FIG. 3 is a cut-away isometric view of the first embodiment of the invention corresponding to a section cut 3—3 shown in FIG. 2.

An integrated optical component 100 in accordance with a first exemplary embodiment of the invention is shown in FIGS. 2 and 3. Integrated optical component 100 comprises a monolithic optically-translucent substrate in which a plurality of optics are formed, including a receiver (RX) optic 102, a transmitter (Tx) optic 104, and a "pickoff" lens 106. Integrated optical component 100 further includes a pair of total internal reflection (TIR) fold mirrors 108 and 110, and a beam position sensor mounting pad 112, as well as optional mounting alignment features that are exemplified by an alignment hole 114 and an alignment slot 116.

In one embodiment, acrylic with an index of refraction of 1.4856 for light having a wavelength of 785 nanometers (nm) may be used for the substrate material. At 785 nm, total internal reflection occurs at an angle of 42.31 degrees between an acrylic/air interface. This angle allows forty-five degree fold mirrors to be made by simply creating an acrylic/air facet in the substrate and "picking" off a small amount of the received optical signal and directing it to a light beam position sensing device (e.g., quad cell, LEC, or CCD) that is used to measure tracking and pointing errors.

As with this and the other embodiments of the invention discussed below, the substrate material for the integrated optic component may comprise various types of optically-translucent materials, such as acrylic and polystyrene plastics, or various types of glass. As used herein, the term optically-translucent means the material enables light having a wavelength corresponding to an optical signal used in a free-space optical communication system to be used. It is noted that such wavelengths may include light in both the non-visible and visible spectrums. When a plastic is used, the integrated optic component may be formed using common plastic molding techniques, such as injection molding. Similar glass molding techniques may be employed for glass substrates. In some instances, it may be desired to use machining, grinding, and/or polishing operations during manufacture of the component in addition to the molding operations.

In the embodiment corresponding to integrated optical component 100, pickoff lens 106 is configured to be coaxial with a parent Rx optic 102 and have a different focal point than its Rx optic, as depicted in FIG. 3 by a centerline 115 and focal points $F_P$ and $F_R$, respectively. Both Rx optic 102 and pickup lens 106 are formed on a front side of the substrate, while TIR fold mirror 108 is formed by a facet defined in the backside of the substrate in substantial alignment with centerline 114.

As an incoming optical signal 14 is received by Rx optic 102 and pickoff lens 106, a: majority of the light beam is directed towards a data detector 12 that is located a focal point $F_R$, as depicted by ray traces 117. The central portion of the light beam, as depicted by ray traces 118 and 120, passes through pickoff lens 106 and is directed toward focal point $F_P$. Prior to reaching the focal point, the light rays impinge on the substrate/air interface of TIR fold mirror 108, whereupon they are internally reflected approximately 90 degrees, redirecting them toward fold mirror 110. Similarly, upon impinging on the substrate/air interface of TIR fold mirror 110, the light rays are internally reflected approximately 90 degrees and redirected␣␣toward an optical beam position sensor 24 that is mounted to mounting paid 112.

The same integrated optic component is also used to transmit an outgoing optical signal 30, as depicted by light rays 122, which are emitted from a transmit laser 34 that is located substantially at focal point FT toward the backside of Tx optic 104, whereupon they are collimated (or slightly divergent) into an optical beam corresponding to outgoing optical signal 30.

The integrated optic component may further include one or more sets of baffles 113 that are defined in the substrate in a manner similar to that illustrated in FIGS. 2 and 3. The baffles are used to prevent light energy from undesired sources, such as sunlight, from reaching optical beam position sensor 24. In generally, any light impinging on the baffle will be refracted and/or reflection away from the desired optical path that impinges on TIR fold mirror 110. The surfaces of the baffles may be painted black to further their efficiency.

Figure 4:
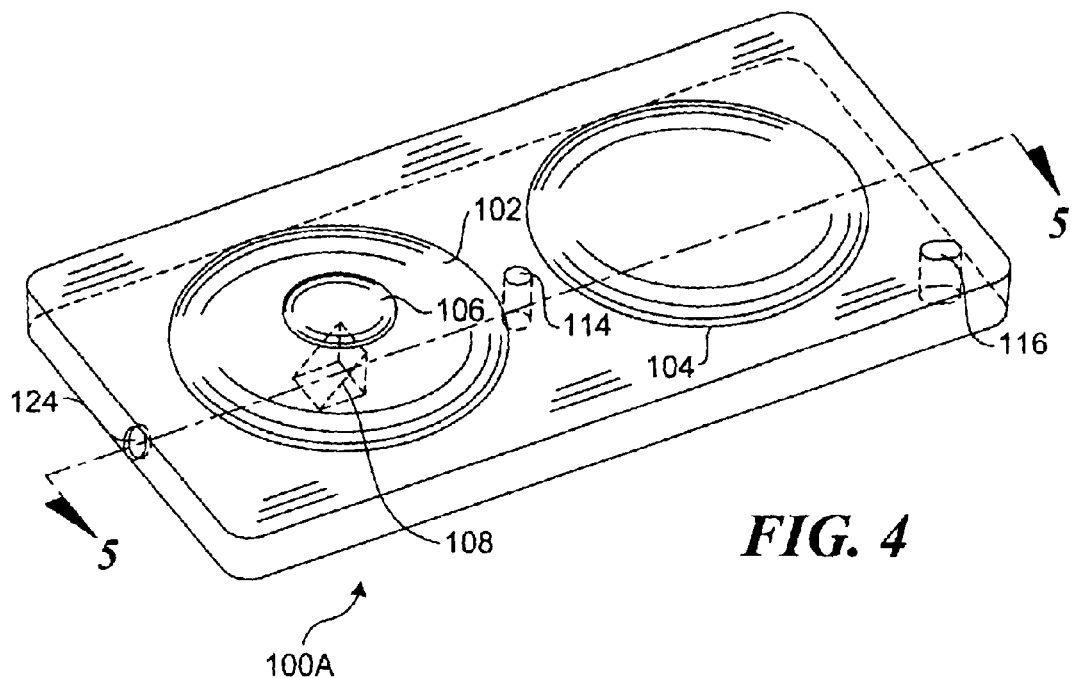
FIG. 4 is an isometric view of an alternative configuration of the first embodiment of the invention in a single TIR fold mirror is used.
Figure 5:
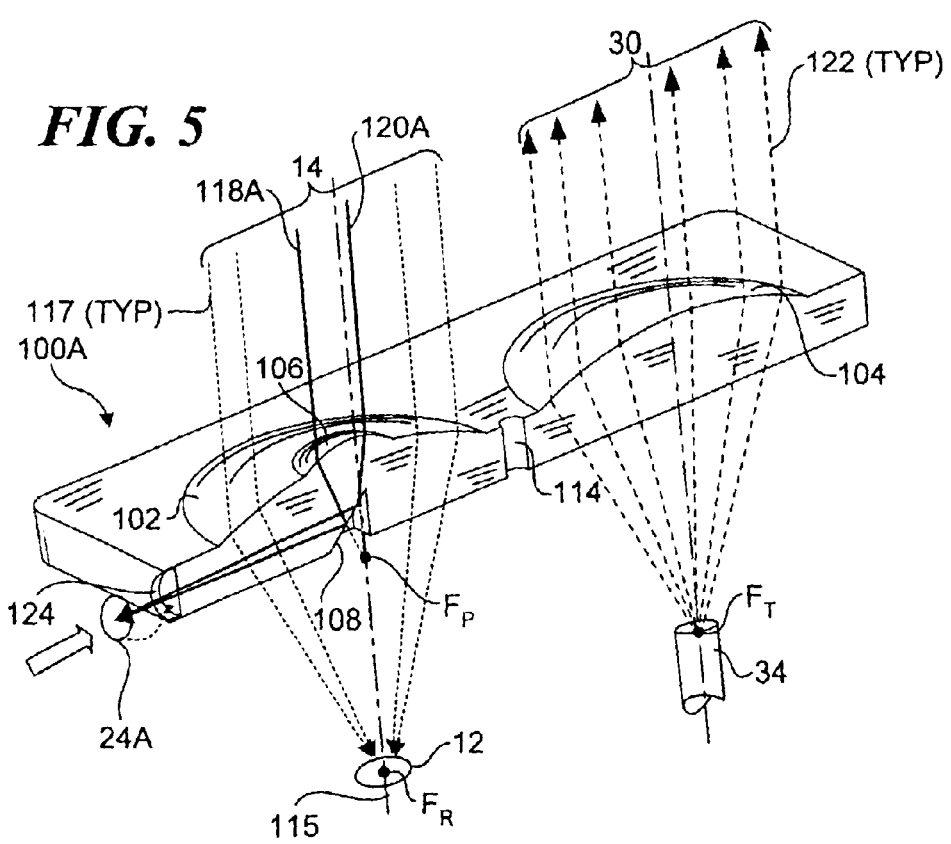
FIG. 5 is a cut-away isometric view of the alternative configuration of the first embodiment corresponding to a section cut 5—5 shown in FIG. 4.

An integrated optic component 100A corresponding to an alternative configuration of the first embodiment of the invention is shown in FIGS. 4 and 5. This configuration is substantially identical to the configuration of integrated optic component 100, except that only a single TIR fold mirror 108 is used. In this instance, TIR fold mirror 110 and optical beam position sensor mounting pad 112 have been removed, while an optical beam position sensor mounting pad 124 has been added. Accordingly, light rays 118A and 120A are directed toward a beam position sensor 24A mounted to mounting pad 124.

Figure 6A:
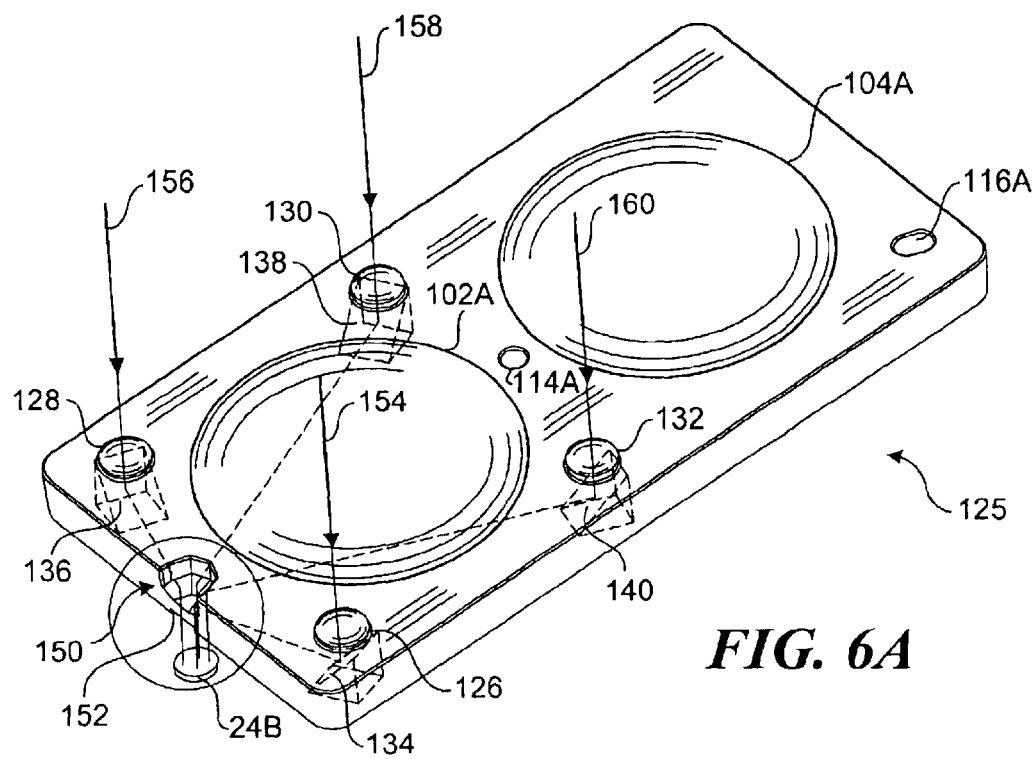
FIG. 6A is an isometric view of a second embodiment of the invention in which a plurality of tracking lenses, respective TIR fold mirrors, and a TIR combiner are employed to direct respective signal-tracking portions of an incoming optical signal toward a light beam position sensor.

In accordance with a second exemplary embodiment of the invention shown in FIG. 6A, an integrated optic component 125 includes four tracking lenses 126, 128, 130, and 132 are disposed around a periphery of an Rx optic 102A with substantially even radial spacing. Integrated optic component 125 further includes a Tx optic 104A and four TIR fold mirrors 134, 136, 138, 140, each of which is disposed opposite a respective tracking lens and redirects a respective portion of an incoming optical signal towards a respective facet 142, 144, 146, 148 defined in a TIR combiner 150, whereupon that portion of the optical signal is redirected towards (and/or combined to a common focus) an optical beam position sensor 24B mounted to a mounting pad 152. The embodiment may further include optional alignment features, such as an alignment hole 114A and an alignment slot 116A.

In integrated optic component 125, Rx optic 102A and a Tx optic 104A function in substantially the same manner as Rx optic 102 and Tx optic 104, respectively, discussed above. For clarity, ray traces corresponding to the portions of the light beams that pass through these optics are not shown herein—it will be understood that a substantial portion of an incoming optical signal is received by Rx optic 102A and directed towards a data detector, while light emitted from a transmit laser is directed toward Tx optic 104A and collimated (or slightly divergent) into an outgoing optical signal in a manner similar to that illustrated in FIGS. 3 and 5.

Figure 9:
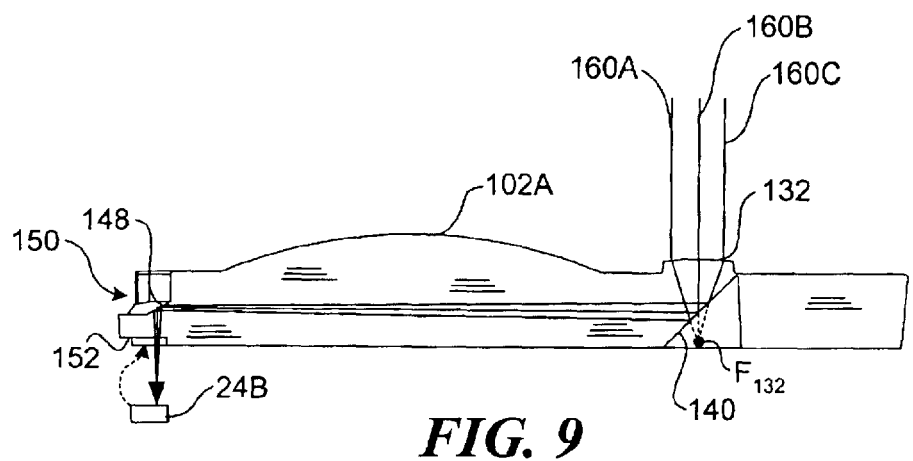
FIG. 9 is an elevation view of the section cut of FIG. 8 in which a plurality of ray traces are illustrated.

In accordance with the second embodiment, the incoming light beam has a path that is wider than the diameter of Rx optic 102A such that portions of the beam fall upon the tracking lenses. These portions are depicted in FIG. 6A as ray traces 154, 156, 158, and 160. Further details of the path a typical portion of the light beam takes as it passes through a tracking lens are depicted by ray traces 160A, 160B, and 160C in FIG. 9. As the ray traces pass through tracking lens 132, they are directed toward its focal point $F_{132}$. Prior to reaching the focal point, the ray traces impinge on the substrate/air interface defined by TIR fold mirror 140, causing them to be internally reflected approximately 90 degrees towards facet 148 defined in TIR combiner 150. Upon impinging on the substrate/air interface of this facet, the light rays are again internally reflected approximately 90 degrees, redirecting them towards light beam position sensor 24B.

Figure 6B:
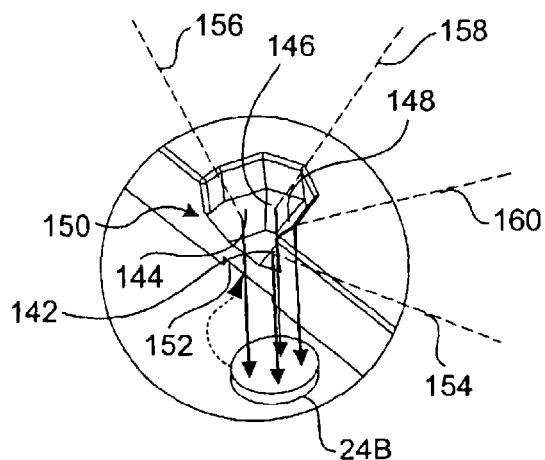
FIG. 6B is a close-up isometric view of the TIR combiner wherein the incoming light rays are directed towards separate areas on the light beam position sensor.
Figure 6C:
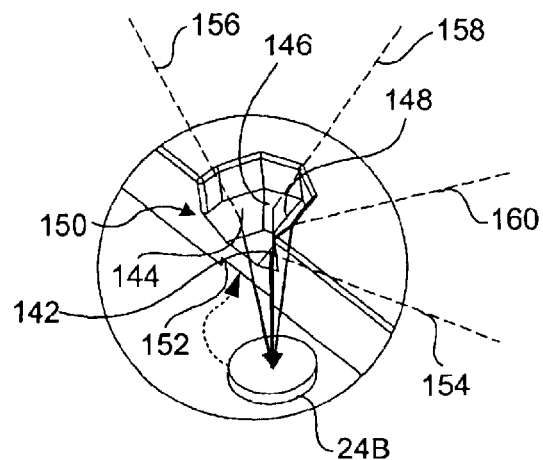
FIG. 6C is a close-up isometric view of the TIR combiner wherein the incoming light rays are directed towards a single coincident area on the light beam position sensor.
Figure 7:
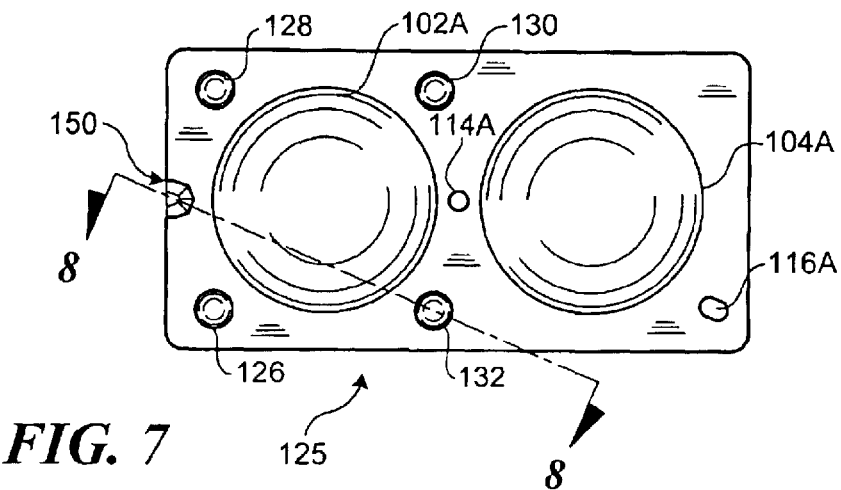
FIG. 7 is a plan view of the integrated optical component corresponding to the second embodiment.
Figure 8:
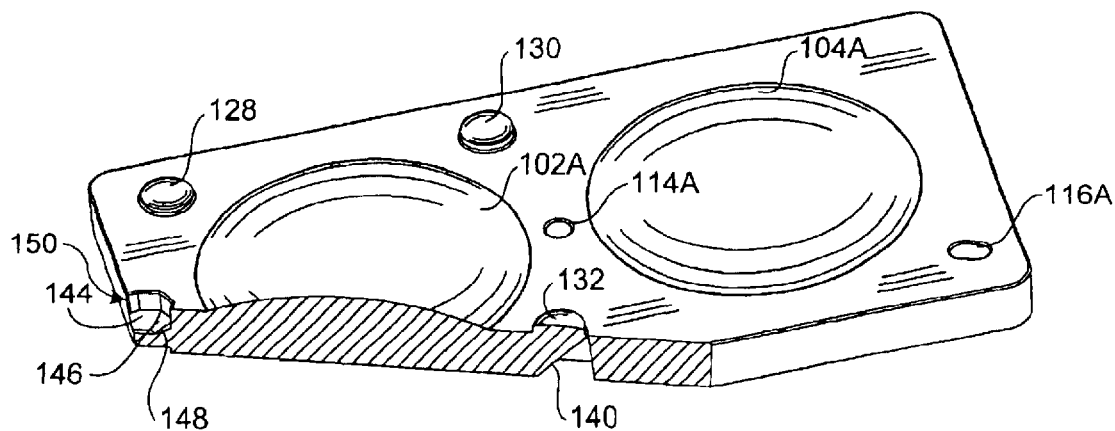
FIG. 8 is an isometric section-view of the second embodiment of the integrated optical component corresponding to a section cut 8—8 shown in FIG. 7.

As shown in FIG. 6B, in one embodiment, ray traces 154, 156, 158, and 160 fall upon respective quadrants of the light beam position sensor. The principle employed in this instance is that by spatially separating the tracking beams, the intensity profile of the incoming light signal may be sampled rather than its wavefront tilt. To sample the latter, the optics may be configured so as to focus the incoming tracking beams onto a coincident point, as shown in FIG. 6C. Further details of how the spatially separate tracking beams are used to determine beam position are disclosed in spending U.S. patent application Ser. No. 09/851,665, entitled "MACRO-QUAD DETECTOR FOR FREE SPACE LASER COMMUNICATIONS, the specification and drawings of which are incorporated herein by reference.

Figure 10:
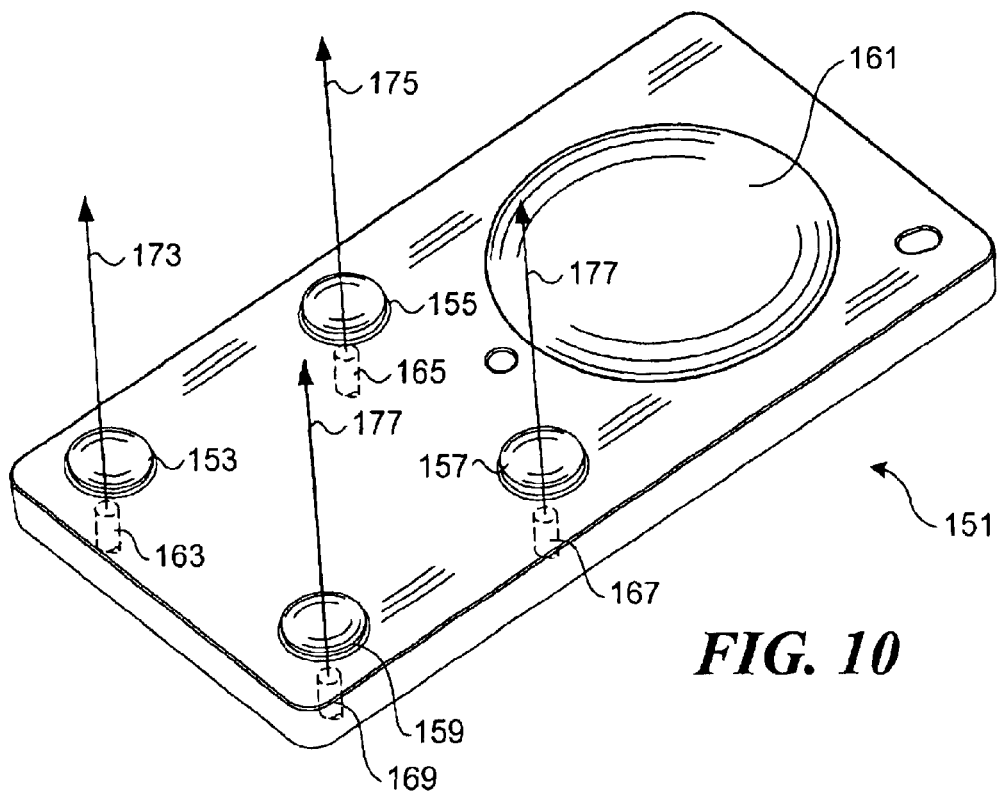
FIG. 10 is an isometric view of an integrated optical component corresponding to a third embodiment of the invention in which a plurality of transmit optics and respective light sources are implemented to produce multiple transmit signals.
Figure 11:
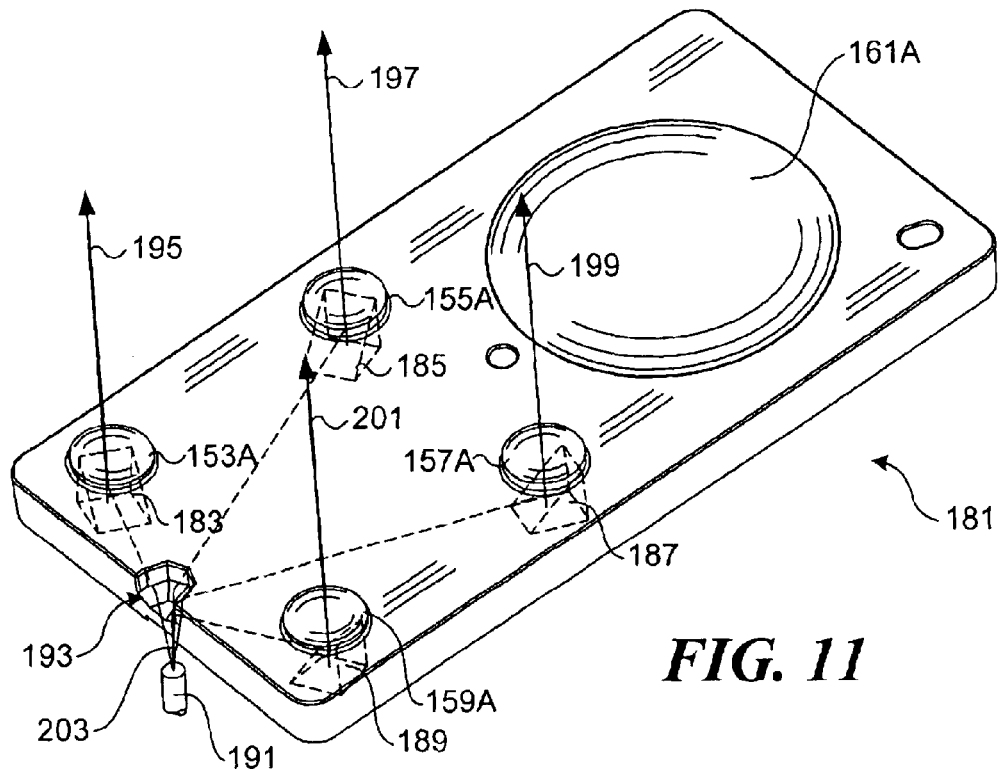
FIG. 11 is an isometric view of an integrated optical component corresponding to a fourth embodiment in which a plurality of transmit optics, respective TIR fold mirrors, and a TIR combiner are employed to produce a plurality of transmit signals using a single light source.

In addition to using multiple lenses and optics for incoming signals, the same can be used for transmitted signals. For example, an integrated optic component 151 shown in FIG. 10 includes a plurality of Tx optics 153, 155, 157 and 159 and an Rx optic 161. Respective light sources 163, 165, 167, and 169 are disposed approximately at the focal points of the Tx optics so as to produce respective transmit signals 173, 175, 177, and 179. In FIG. 11, an integrated optic component 181 includes a plurality of Tx optics 153A, 155A, 157A and 159A and an Rx optic 161A. Respective fold mirrors 183, 185, 187, and 189 are disposed proximate to corresponding Tx optics so as to receive a light beam portion emitted from a light source 191 and redirected by a respective facet defined in a TIR combiner 193. The received light beam portions are then redirected by the respective fold mirrors toward their corresponding Tx optic to produce transmit signals 195, 197, 199, and 201. In this manner, multiple transmit signals can be generated from a single light beam 203.

It will be appreciated that multiple optic, fold mirrors and faceted features may be used for both transmitted and received optical signals in accordance with the principles of the invention. For example, an integrated optic component may include any combination of the Tx lens and associated optic configurations for integrated optic components 151 and 181 along with the Rx lens and associated optic configurations corresponding to integrated optic components 100, 100A, and 125 discussed above.

In some instances, the configuration of the fold mirror and other facets may not meet the TIR condition due to inappropriate incident angles of the light beams. In such circumstances, a reflective coating (e.g., various silver-based coatings) may be added to the facet surface to cause the light beam to be reflected in a manner similar to the TIR reflections described above and shown in the Figures herein.

Figure 12:
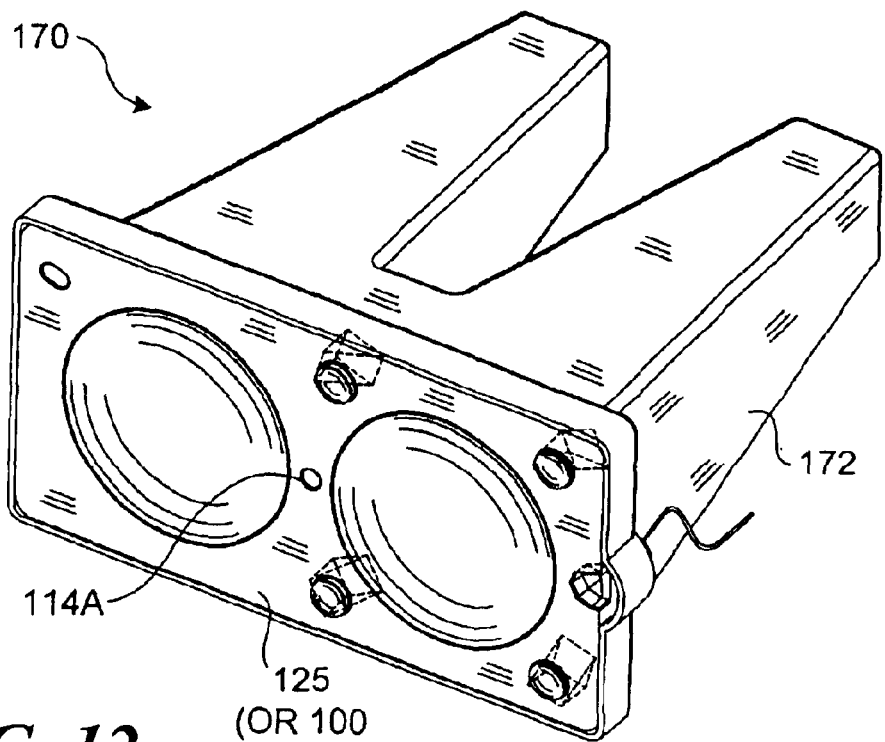
FIG. 12 is a front isometric view of an FSO transceiver that is suitable for use with the integrated optical component embodiments of the invention.
Figure 13:
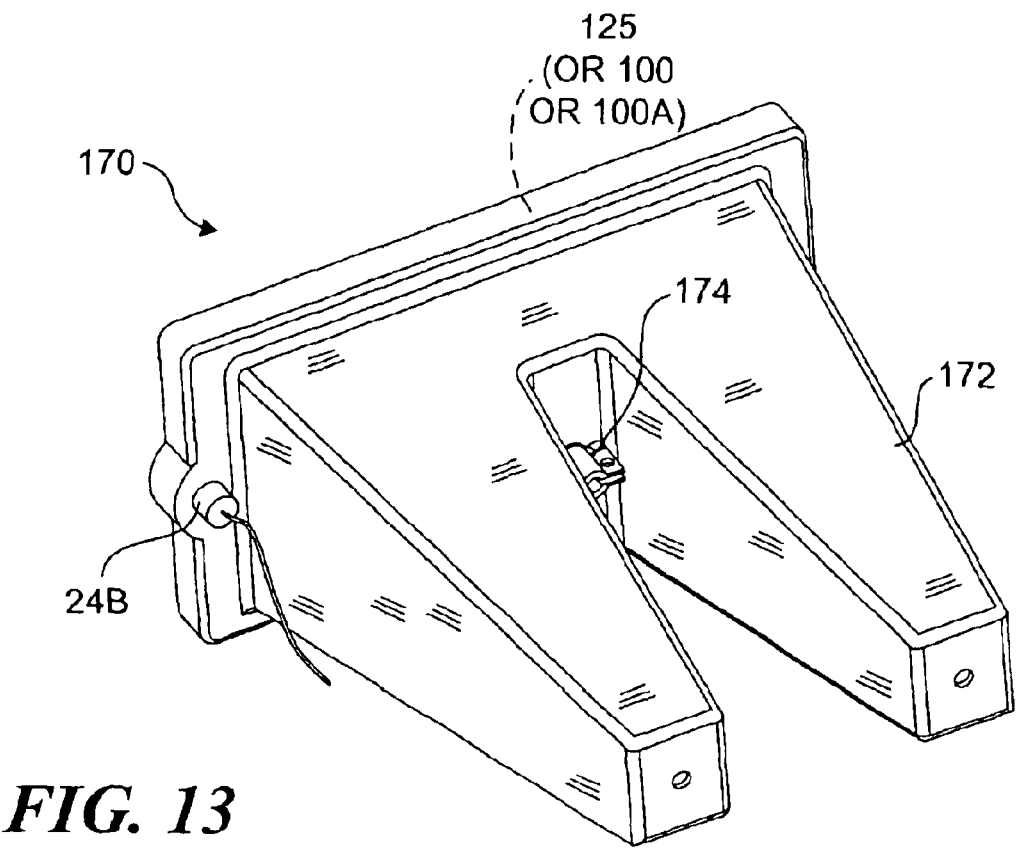
FIG. 13 is a rear isometric view of the FSO transceiver of FIG. 10.
Figure 14:
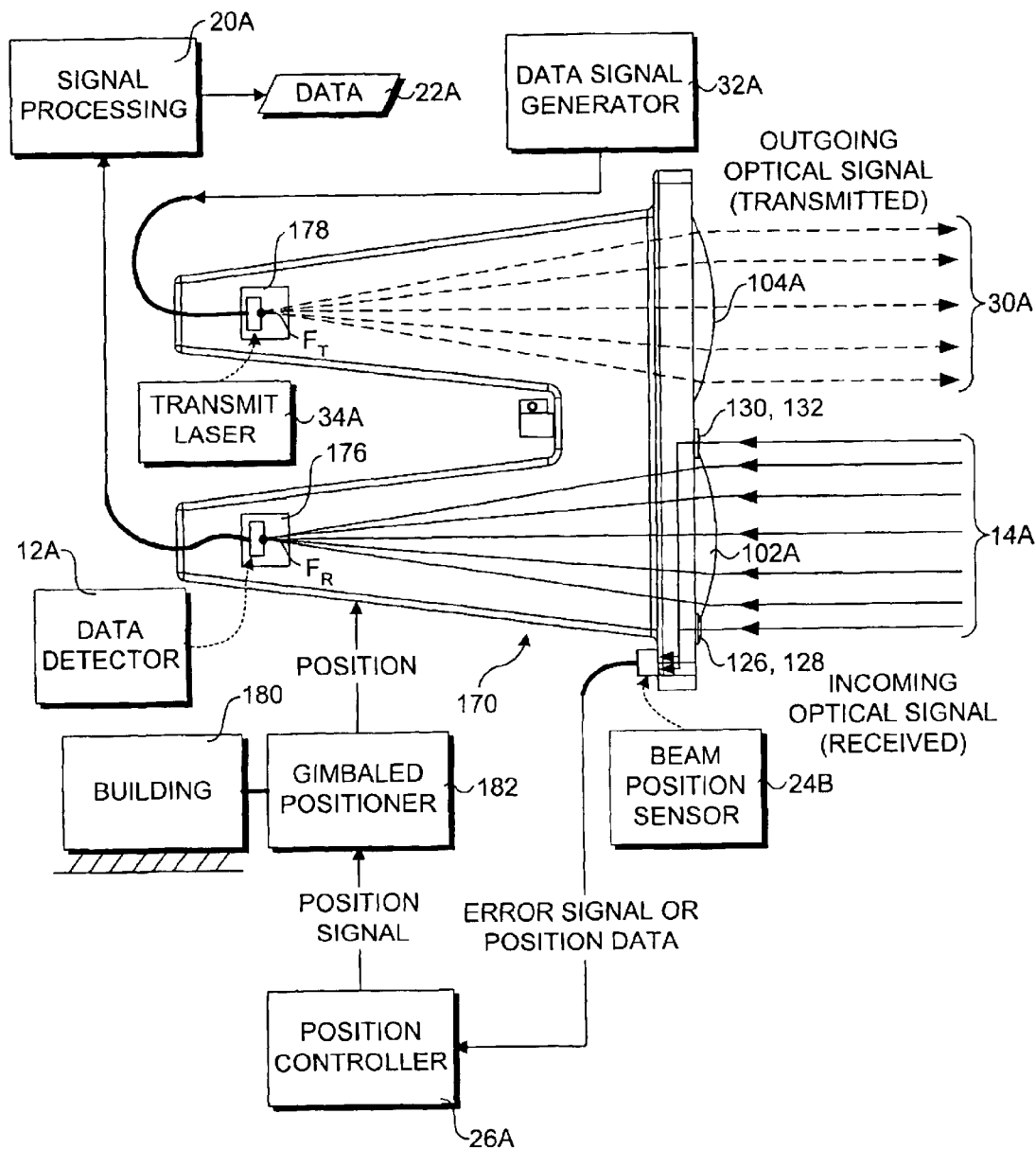
FIG. 14 is a block schematic diagram of a position control scheme corresponding to the FSO transceiver of FIG. 10.

An FSO transceiver 170 that may implement any of integrated optic components 100, 100A, 125, 151, or 181 is shown in FIGS. 12, 13 and 14. (For illustrative purposes, FSO transceiver 170 is shown using an integrated optic component 125 in these Figures—however, any of the integrated optic components may be used.) The FSO transceiver includes a housing 172 in which the integrated optic component is mounted. In one embodiment, the shank portion of a headed alignment pin (not shown) is passed through alignment hole 114A and a corresponding alignment hole in housing 172 (also not shown) and is clamped by a clamp 174, thereby securing the integrated optic component to the housing in proper alignment. In addition, a second alignment pin may be received by alignment slot 116A upon assembly of the integrated optic component to the housing to assist in aligning the integrated optic component to the housing. The housing further includes mounting provisions for light beam position sensor 24B.

As shown in FIG. 14, a data detector 12A is mounted inside one side of housing 170 via an adjustable mount 176 that is used to position the data detector such that it is located coincident with the focal point FR of Rx optic 102A. Similarly, a transmit laser 34A (or free end of a fiber optic signal cable) is mounted inside the other side of the housing via an adjustable mount 178 that is used to position the transmit laser such that it emits an optical signal from the focal point FT of Tx optic 104A. It is noted that if high-precision manufacturing techniques are used, it may be possible to fixedly mount the data detector and/or transmit laser to the housing rather than require the use of adjustable mounts.

An FSO transceiver 170 is operatively coupled to a building 180 via a gimbaled positioner 182, which includes a base portion fixedly coupled to the building and a gimbaled movement coupled to housing 172 (details not shown such gimbaled positioners are well-known in the mechanical arts). The FSO transceiver may then be positioned in the manner described below. In addition to gimbaled positioners, other types of positioners that are well known in the mechanical arts, such as flexures, may be used.

As an incoming optical signal 14A is received, the majority of the corresponding light beam passes through Rx optic 102A and is received by data detector 12A, which produces a data signal that is processed by a signal processing block 20A to produce data 22A. Also, a data signal generator 32A is used to drive transmit laser 34A, causing a light beam to be emitted that is directed toward Tx optic 104A, which collimates (or substantially collimates) the light beam into an outgoing optical signal 30A. While the majority of the incoming optical signal pass through the Rx optic, portions of the light beam pass through tracking lenses 126, 128, 130, and 132, whereupon these portions are redirected toward the TIR combiner via respective fold mirrors in the manner discussed above with reference to FIGS. 6A, 6B, and 7–9. Upon impinging on the facets of the TIR combiner, the light portions are redirected towards optical beam position sensor 24B.

Figure 15:
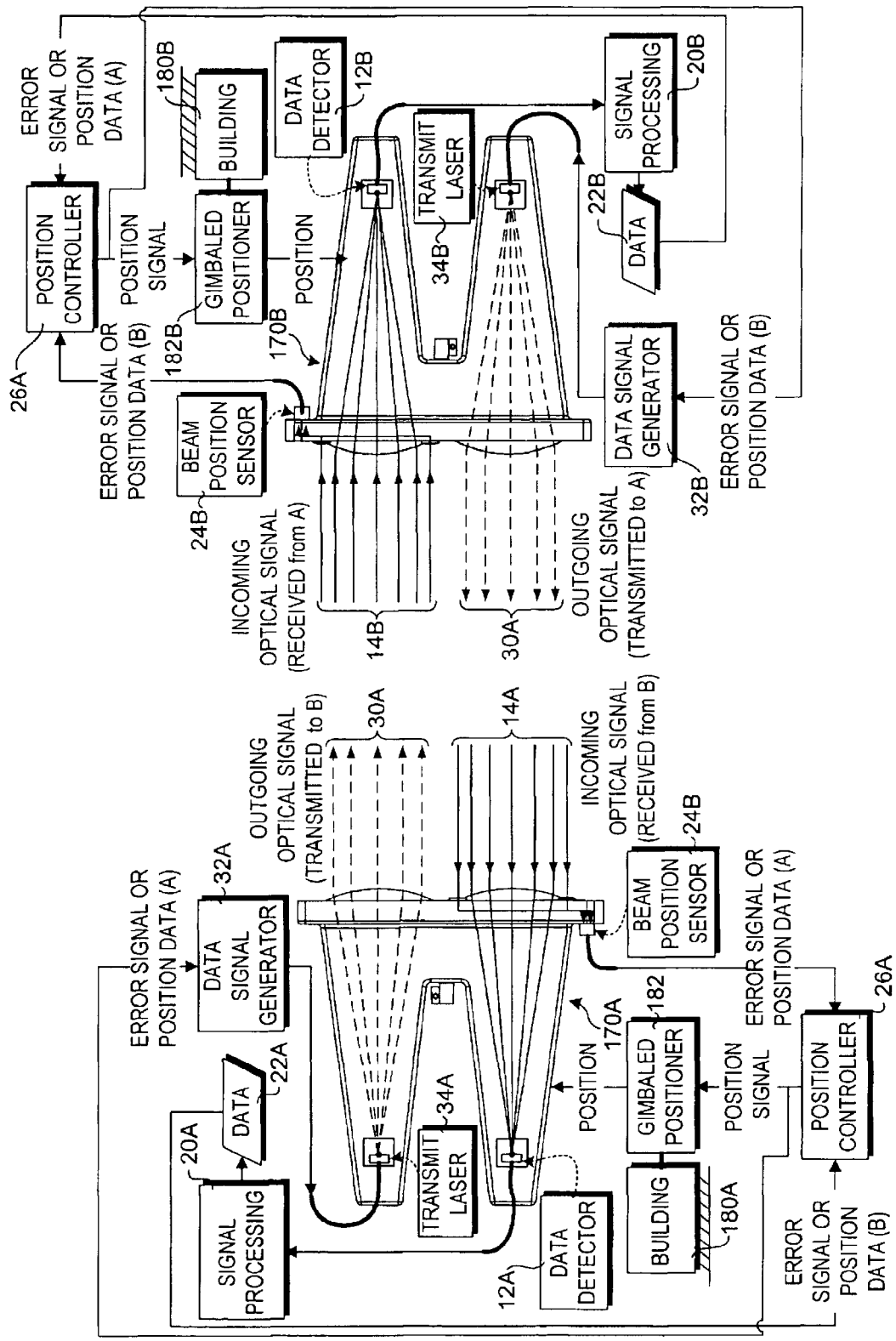
FIG. 15 is a block schematic diagram corresponding to a position control scheme in which position/error data sensed by a first FSO transceiver is used to control the position of a second FSO transceiver and visa versa.

Depending on the type of sensor used for optical beam position sensor 24B, an error signal and/or position data is generated by the sensor and passed to a position controller 26A. The position controller processes its input data to generate a position signal (typically a multi-axis motor or solenoid drive signal) that is sent to gimbaled positioner 182 to position the transceiver:

Another control scheme is illustrated in FIG. 15. In this scheme, position/error data sensed by an optical beam position sensor 24BA corresponding to a first FSO transceiver 170A is used to position a second FSO transceiver 170B, while position/error data sensed by an optical beam position sensor 24BB corresponding to second FSO transceiver 170B is used to position first FSO transceiver 170A. Both transceivers include substantially identical components corresponding to those discussed above with reference to FIG. 12, wherein FSO transceiver 170A's components include an appended "A" in the reference numerals while FSO transceiver 170B's components include an append "B."

The scheme is enabled by sending data corresponding to a detected error signal or beam position from the transceiver that senses the data to the transceiver it is linked in communication with (its paired transceiver), whereupon once the paired transceiver receives the data, it is passed to that transceiver's position controller, which processes the data to produce the position signal to control that transceiver's position. It is noted that either a pure cross-correlation control loop may be used (i.e., a control loop that only considers position/error data sent from its paired transceiver) or a hybrid control loop may be used (i.e., a control loop that considers position/error data that is both generated by that transceiver and received as data from its paired transceiver).

Figure 16:
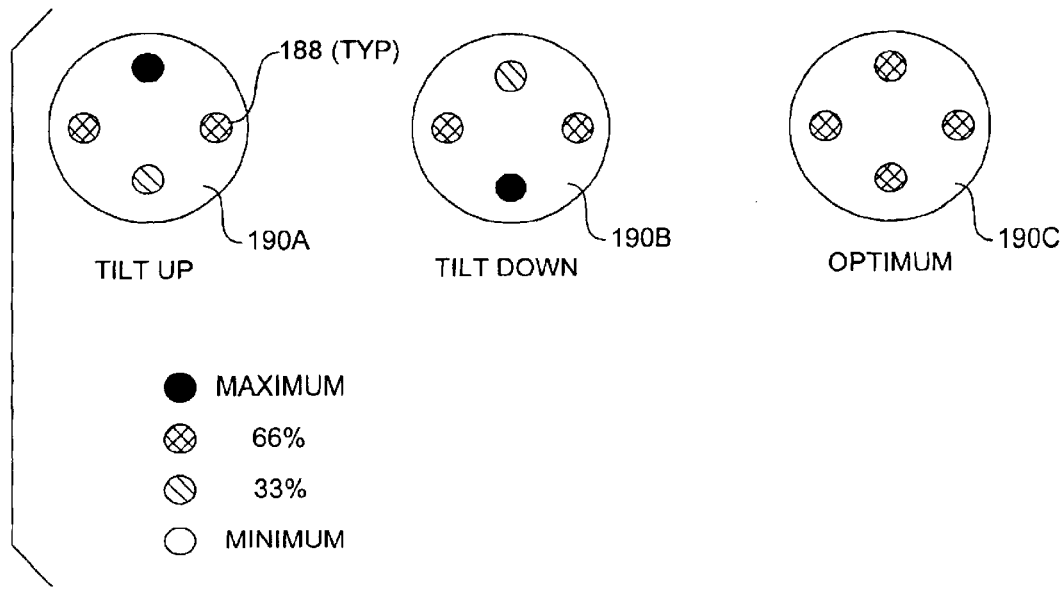
FIG. 16 is a schematic diagram illustrating various optical wavefront tilt conditions sensed by a quad cell.

An exemplary set of position/error data positions as sensed by a quad cell is shown in FIG. 16. A quad cell comprises four light detectors 188 that are typically arranged in equilateral quadrants, and are well-suited for detecting tilt in an optical signal wavefront or change in field angle. For example, a tilt up condition is shown in a condition 190A, a tilt-down condition is sensed in a condition 190B and an optimum condition is sensed in a condition 190C. Typically, a quad cell (or corresponding drive electronics coupled to the quad cell) will generate discreet data signals corresponding to the signal strengths detected by each of the four light detectors. These discreet data signals are then processed by the position controller to generate an appropriate position signal.

Figure 17:
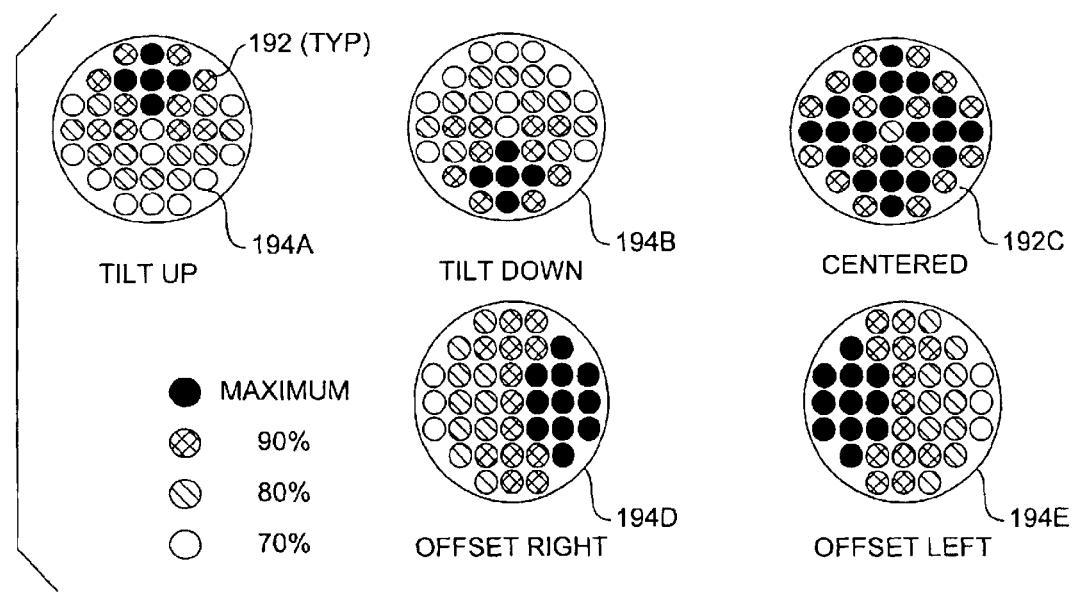
FIG. 17 is a schematic diagram illustrating various optical wavefront tilt and offset conditions sensed by a CCD or video camera sensor.

As discussed above, the optical beam position sensor may also comprise and a CCD, video camera, or LEC (lateral effect cell). In the case of CCD's and video cameras, a sensor comprising an array of pixilated light detectors 192 are used. These sensors can also detect wavefront tilt or field offsets as depicted by conditions 194 A–E in FIG. 17. As with quad cells, each light detector produces discreet data corresponding to the signal strength measured by that detector. These data are generally sampled in an ordered fashion (e.g., sequentially row-by-row), either through built-in circuitry or an external circuit coupled to the CCD or video camera. The data are then sent to the position controller, which analyzes the data and produces an appropriate position signal to adjust the position of the FSO transceiver so as to optimize the received and/or transmitted signal strength.

Although the present invention has been described in connection with a preferred form of practicing it and modifications thereto, those of ordinary skill in the art will understand that many other modifications can be made to the invention within the scope of the claims that follow. Accordingly, it is not intended that the scope of the invention in any way be limited by the above description, but instead be determined entirely by reference to the claims that follow.

What is claimed is:

1. An integrated optical component comprising a monolithic optically-translucent substrate having a plurality of optics formed therein, including:
   a receiver optic having a first focal point and configured to receive a substantial portion of an incoming optical beam and direct the optical beam toward the first focal point;
   a transmitter optic having a second focal point and configured to receive light emitted from a light source directed from the second focal point and direct the light outward as an outgoing optical beam;
   a pickoff lens having a third focal point and configured to receive a tracking portion of the incoming optical beam and direct said tracking portion towards the third focal point; and
   a first fold mirror configured to receive the tracking portion of the light beam and redirect it toward a first predetermined direction.

2. The integrated optical component of claim 1, wherein the pickoff lens is coaxial with the receiving lens such that the first and third focal points are disposed at different lengths along a common axis.

3. The integrated optical component of claim 2, wherein the pickoff lens comprises a convex lens formed on a front surface of the monolithic optically-translucent substrate, further comprising a second fold mirror defined by a second substrate/air facet defined in the front surface of the monolithic optically-translucent substrate to which a reflective coating is applied, and further wherein the first fold mirror is configured to redirect the tracking portion of the light beam through the monolithic optically-translucent substrate toward the second fold mirror, which in turn redirects the tracking portion of the light beam toward a second predetermined direction.

4. The integrated optical component of claim 1, wherein the first fold mirror comprises a first substrate/air facet defined in a back surface of the monolithic optically-translucent substrate to which a reflective coating is applied.

5. The integrated optical component of claim 1, wherein the first fold mirror is a first total internal reflection (TIR) fold mirror comprising a first substrate/air facet defined in a back surface of the monolithic optically-translucent substrate.

6. The integrated optical component of claim 5, wherein the pickoff lens comprises a convex lens formed on a front surface of the monolithic optically-translucent substrate, further comprising a second TIR fold mirror defined by a second substrate/air facet defined in the front surface of the monolithic optically-translucent substrate, and further wherein the first TIR fold mirror is configured to redirect the tracking portion of the light beam through the monolithic optically-translucent substrate toward the second TIR fold mirror, which in turn redirects the tracking portion of the light beam toward a second predetermined direction.

7. The integrated optical component of claim 6, further comprising a mounting pad disposed on the back surface of the monolithic optically-translucent substrate to which an optical beam position sensor may be mounted such that the optical beam position sensor receives the tracking portion of the light beam redirected by the second TIR fold mirror.

8. The integrated optical component of claim 1, wherein the monolithic optically-translucent substrate comprises a plastic.

9. The integrated optical component of claim 1, wherein the monolithic optically-translucent substrate comprises a glass.

10. The integrated optical component of claim 1, further including at least one alignment hole defined in the monolithic optically-translucent substrate and configured to receive an alignment pin upon assembly of the integrated optical component to an optical mount.

11. The integrated optical component of claim 1, further including at least one baffle defined in the monolithic optically-translucent substrate proximate to a desired path along which the tracking portion of the light beam is directed to block unwanted optical energy from the desired path.

12. An integrated optical component comprising a monolithic optically-translucent substrate in which a plurality of optics are formed, including:
   a receiver optic having a first focal point and configured to receive a substantial portion of an incoming optical beam and direct the optical beam toward the first focal point;

a transmitter optic having a second focal point and configured to receive light emitted from a light source directed from the second focal point and direct the light outward as an outgoing optical beam;

a total internal reflection (TIR) combiner comprising a plurality of substrate/air facets defined in a surface of the monolithic optically-translucent substrate, each substrate/air facet configured to receive a light beam portion and redirect the light beam portion toward a respective predetermined direction; and a plurality of tracking lenses, each having a respective focal point and configured to receive a portion of the incoming optical beam and direct said portion towards its respective focal point; and a plurality of TIR fold mirrors, each configured to receive a respective portion of the incoming light beam received by a respective tracking lens that is directed toward that TIR fold mirror and redirect the respective portion of the incoming light beam towards a respective substrate/facet of the TIR combiner.

13. The integrated optical component of claim 12, wherein the plurality of tracking lenses are radially disposed about the receiving optic at substantially evenly spaced angles.

14. The integrated optical component of claim 12, wherein the TIR combiner is disposed between the receiving optic and the transmitting optic.

15. The apparatus of claim 12, wherein the monolithic optically-translucent substrate comprises a plastic.

16. The apparatus of claim 12, wherein the monolithic optically-translucent substrate comprises a glass.

17. The integrated optical component of claim 12, further comprising a mounting pad disposed on a surface of the monolithic optically-translucent substrate to which an optical beam position sensor may be mounted such that the optical beam position sensor receives the portions of the incoming light beam that are redirected by the respective substrate/air facets defined in the TIR combiner.

18. The integrated optical component of claim 12, further including at least one alignment hole defined in the monolithic optically-translucent substrate and configured to receive an alignment pin upon assembly of the integrated optical component to an optical mount.

19. An integrated optical component comprising a monolithic optically-translucent substrate in which a plurality of optics are formed, including:

a receiver optic having a first focal point and configured to receive a substantial portion of an incoming optical beam and direct the optical beam toward the first focal point; and a plurality of transmitter optics, each having a respective focal point and configured to receive light emitted from a respective light source disposed proximate to the respective focal point and direct the light outward as a respective outgoing optical beam.

20. The integrated optical component of claim 19, wherein the plurality of tracking transmitter optics are radially disposed about at substantially evenly spaced angles.

21. An integrated optical component comprising a monolithic optically-translucent substrate in which a plurality of optics are formed, including:

a receiver optic having a first focal point and configured to receive a substantial portion of an incoming optical beam and direct the optical beam toward the first focal point;

a plurality of transmitter optics;

a combiner comprising a plurality of substrate/air facets defined in a surface of the monolithic optically-translucent substrate, each substrate/air facet configured to receive a respective portion of a light beam emitted from a light source and redirect the light beam portion toward a respective predetermined direction; and a plurality of fold mirrors, each configured to receive a respective light beam portion and redirect the respective light beam portion towards a respective transmitter optic, wherein light beam portions exit the plurality of transmitter lenses as a plurality of substantially collimated transmitted optical signals.

22. The integrated optical component of claim 21, wherein the combiner comprises a total internal reflection (TIR) combiner.

23. The integrated optical component of claim 22, wherein each of the fold mirrors comprises a total internal reflection fold mirror.

24. A free space optical (FSO) transceiver comprising:

a housing;

a light receiver coupled to the housing;

a light source coupled to the housing;

a monolithic optically-translucent substrate coupled to the housing having a plurality of optics formed therein, including:

a receiver optic having a first focal point substantially coincident with an input of the light receiver and configured to receive a substantial portion of an incoming optical beam and direct the optical beam toward the light receiver;

a transmitter optic having a second focal point substantially coincident with a location of the light source and configured to receive light emitted from the light source and direct the light outward as an outgoing optical beam;

a pickoff lens having a third focal point and configured to receive a portion of the incoming optical beam and direct said portion towards the third focal point;

a first total internal reflection (TIR) fold mirror configured to receive the portion of the light beam received by the pickoff lens and directed towards the third focal point and redirect this portion of the light beam towards a first predetermined direction; and a second TIR fold mirror configured to received the portion of the light beam redirected by the first TIR fold mirror toward the first predetermined location and redirect the portion of the light beam toward a second predetermined direction; and an optical beam position sensor, operatively coupled to the monolithic optically-translucent substrate so as to receive the portion of the light beam redirected by the second TIR fold mirror toward the second predetermined direction.

25. The FSO transceiver of claim 24, wherein the optical beam position sensor comprises a quad cell.

26. The FSO transceiver of claim 24, wherein the optical beam position sensor comprises a charge-coupled device.

27. The FSO transceiver of claim 24, wherein the optical beam position sensor comprises a lateral effect cell.

28. The FSO transceiver of claim 24, further comprising:

a positioner having a rigid portion fixedly coupled to a building structure and a movable portion coupled to the housing so as to enable the positioner to position the housing; and a position controller, receiving position data from the optical beam position sensor and driving the positioner so as to optimize a position of the FSO transceiver based on the position data.

29. A free space optical (FSO) transceiver comprising:
a housing;
a light receiver coupled to the housing;
a light source coupled to the housing;
a monolithic optically-translucent substrate coupled to the housing having a plurality of optics formed therein, including:
    a receiver optic having a first focal point and configured to receive a substantial portion of an incoming optical beam and direct the optical beam toward the first focal point;
    a transmitter optic having a second focal point and configured to receive light emitted from a light source directed from the second focal point and direct the light outward as an outgoing optical beam;
    a total internal reflection (TIR) combiner comprising a plurality of substrate/air facets defined in a surface of the monolithic optically-translucent substrate, each substrate/air facet configured to receive a light beam portion and redirect the light beam portion toward a respective predetermined direction; and
    a plurality of tracking lenses, each having a respective focal point and configured to receive a portion of the incoming optical beam and direct said portion towards its respective focal point; and
    a plurality of TIR fold mirrors, each configured to receive a respective portion of the incoming light beam received by a respective tracking lens that is directed toward that TIR fold mirror and redirect the respective portion of the incoming light beam towards a respective substrate/facet of the TIR combiner; and
an optical beam position sensor, operatively coupled to the monolithic optically-translucent substrate proximate to the TIR combiner so as to received the respective portions of the light beam redirected by the TIR combiner toward the respective predetermined directions.

30. The FSO transceiver of claim 29, wherein the optical beam position sensor comprises a quad cell.

31. The FSO transceiver of claim 29, wherein the optical beam position sensor comprises a charge-coupled device.

32. The FSO transceiver of claim 29, wherein the optical beam position sensor comprises a lateral effect cell.

33. The FSO transceiver of claim 29, further comprising:
a positioner having a rigid portion fixedly coupled to a building structure and a movable portion coupled to the housing so as to enable the positioner to position the housing; and
a position controller, receiving position data from the optical beam position sensor and driving the positioner so as to optimize a position of the FSO transceiver based on the position data.

34. A method for controlling a position of a free space optical (FSO) transceiver, comprising:
directing a portion of an incoming optical signal received by a monolithic integrated optic component disposed in the FSO transceiver towards a optical beam position sensor using a plurality of optics defined in the integrated optic component;
determining a positional error based on data provided by the optical beam position sensor; and
adjusting a position of the FSO transceiver based on the positional error.

35. The method of claim 34, wherein the integrated optic component includes a pickoff lens and a total internal reflection (TIR) fold mirror, and wherein directing the portion of the incoming optical signal toward the optical beam position sensor comprises:
receiving the portion of the incoming optical signal with the pickoff lens and directing it towards the TIR fold mirror; and
redirecting the portion of the optical signal with the TIR fold mirror towards the optical beam position sensor.

36. The method of claim 34, wherein the integrated optic component includes a pickoff lens and first and second total internal reflection (TIR) fold mirrors, and wherein directing the portion of the incoming optical signal toward the optical beam position sensor comprises:
receiving the portion of the incoming optical signal with the pickoff lens and directing it towards the first TIR fold mirror;
redirecting the portion of the optical signal with the first TIR fold mirror towards the second TIR fold mirror; and
redirecting the portion of the optical signal with the second TIR fold mirror towards the optical beam position sensor.

37. A method for controlling a position of a free space optical (FSO) transceiver, comprising:
directing respective portions of an incoming optical signal received by a monolithic integrated optic component disposed in the FSO transceiver towards a total internal reflection (TIR) combiner defined in the integrated optic component using a plurality of optics defined in the integrated optic component;
redirecting the respective portions of the incoming optical signal via the TIR combiner toward a optical beam position sensor;
determining a positional error based on data provided by the optical beam position sensor; and
adjusting a position of the FSO transceiver based on the positional error.

38. The method of claim 37, wherein the integrated optic component includes a plurality of tracking lenses, each having a corresponding TIR fold mirror disposed in proximity, thereto; and wherein directing the respective portions of the incoming optical signal toward the TIR combiner comprises:
receiving the respective portions of the incoming optical signal with the plurality of tracking lenses, each tracking lens directing the respective portion of light that it receives towards its corresponding TIR fold mirror; and
for each TIR fold mirror, redirecting the portion of the optical signal directed towards that TIR fold mirror towards a respective facet defined in the TIR combiner.

39. A method for controlling a position of a first free space optical (FSO) transceiver, comprising:
establishing a communication link with a second FSO transceiver;
directing a portion of a first incoming optical signal received by a first integrated optic component disposed in the second FSO transceiver towards a first optical beam position sensor using a plurality of optics defined in the integrated optic component;
transmitting position data obtained by the first optical beam position sensor to the first FSO transceiver;

determining a positional error based on the position data; and adjusting a position of the first FSO transceiver based on the positional error.

40. The method of claim 39, further comprising:

directing a portion of a second incoming optical signal received by a second integrated optic component disposed in the first FSO transceiver towards a second optical beam position sensor using a plurality of optics defined in the second integrated optic component;

obtaining position data from the second light beam position;

determining the positional error based on a combination of position data obtained from the first and second optical beam position sensors; and adjusting a position of the first FSO transceiver based on the positional error.

41. A method for controlling a position of a first free space optical (FSO) transceiver, comprising:

establishing a communication link with a second FSO transceiver;

directing respective portions of a first incoming optical signal received by a first integrated optic component disposed in the second FSO transceiver towards a first total internal reflection (TIR) combiner defined in the integrated optic component using a plurality of optics defined in the integrated optic component;

redirecting the respective portions of the first incoming optical signal via the first TIR combiner toward a first optical beam position sensor;

transmitting position data obtained by the first optical beam position sensor to the first FSO transceiver;

determining a positional error based on the position data; and adjusting a position of the first FSO transceiver based on the positional error.

42. The method of claim 41, further comprising:

directing a portion of a second incoming optical signal received by a second integrated optic component disposed in the first FSO transceiver towards a second optical beam position sensor using a plurality of optics defined in the second integrated optic component;

directing respective portions of a second incoming optical signal received by a second integrated optic component disposed in the first FSO transceiver towards a second total internal reflection (TIR) combiner defined in the second integrated optic component using a plurality of optics defined in the second integrated optic component;

redirecting the respective portions of the second incoming optical signal via the second TIR combiner toward a second optical beam position sensor;

obtaining position data from the second light beam position;

determining the positional error based on a combination of position data obtained from the first and second optical beam position sensors; and adjusting a position of the first FSO transceiver based on the positional error.

* * * * *